United States Patent
Kawagishi

(10) Patent No.: US 6,411,200 B1
(45) Date of Patent: Jun. 25, 2002

(54) CARD READER/WRITER AND COMMUNICATION METHOD OF CARD READER WRITER

(75) Inventor: Toshiyuki Kawagishi, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/265,530

(22) Filed: Mar. 9, 1999

(30) Foreign Application Priority Data

Mar. 26, 1998 (JP) .......................................... 10-079332

(51) Int. Cl.[7] ................................................ H04Q 5/22
(52) U.S. Cl. .................. 340/10.51; 340/5.61; 340/5.74; 235/380; 235/382
(58) Field of Search ............................ 340/10.51, 5.61, 340/5.74; 235/380, 382

(56) References Cited

U.S. PATENT DOCUMENTS 5,113,184 A * 5/1992 Katayama ................ 340/10.51
5,204,512 A * 4/1993 Ieki et al. .................... 235/382
5,763,862 A * 6/1998 Jachimowicz et al. ...... 235/380

FOREIGN PATENT DOCUMENTS

| EP | 0 583 526 | 2/1994 |
| WO | WO 97/46964 | 12/1997 |

* cited by examiner

Primary Examiner—Michael Horabik
Assistant Examiner—Yves Dalencourt
(74) Attorney, Agent, or Firm—Pillsbury Winthrop LLP

(57) ABSTRACT

When a CPU receives a "card read permission" command from a personal computer connected to a connector, through a communication controller, the CPU controls a switching controller to switch interfaces through a card I/F, controls a non-contact card I/F to send through an antenna a carry signal used for non-contact card communication, then waits for a response signal from an IC card C as a non-contact card. When the CPU receives a response signal from the IC card C, the CPU disables a contact card I/F with use of the switching controller, and sends the response signal which is sent from the IC card C to the personal computer through the communication controller.

3 Claims, 5 Drawing Sheets

CARD READER/WRITER AND COMMUNICATION METHOD OF CARD READER WRITER

BACKGROUND OF THE INVENTION

This invention relates to a card reader/writer for performing data communication of reading/writing information from/into a card such as an IC card, and a communication method of the card reader/writer.

Conventionally, a contact card reader/writer and a non-contact card reader/writer cannot be formed as one apparatus. When one card reader/writer communicates with both a contact card and a non-contact card, the circuit in the card reader/writer-must be formed so as to be used by these two objects. The sharing of the circuit is, however, so difficult that the manufacturing cost will increase. For this reason, there has not been provided the card reader/writer capable of communication with both a contact card and a non-contact card.

BRIEF SUMMARY OF THE INVENTION

The object of the present invention is to provide a card reader/writer capable of communication with both a contact card and a non-contact card in order to read/write data therein, and a communication method of the card reader/writer.

The above-mentioned object of the present invention are attained by a card reader/writer comprising: first means for performing data communication with a non-contact card through an antenna; second means for performing data communication with a contact card; switching means for switching the second means and the first means; and control means for performing data communication with a card by using the switching means to switch one of the first means and the second means.

The above-mentioned object of the present invention are attained by a card reader/writer connected to a superior apparatus to perform data communication with a card, comprising: communication means for performing data communication with a non-contact card via an antenna; processing means for performing data communication with a contact card; switching means for switching the processing means and the communication means; control means for, when an apparatus reader/writer receives a card read permission signal from the superior apparatus, controlling the switching means to switch the processing means and the communication means, and performing one of the data communication control of controlling data communication with the non-contact card by using the communication means and the data communication control of controlling data communication with the contact card by using the processing means.

The above-mentioned object of the present invention are attained by a card reader/writer comprising: a first interface for performing data communication with a non-contact card through an antenna; a second interface for performing data communication with a contact card; first determination means for determining whether or not the non-contact card sends a response signal after sending a driving signal is sent to the non-contact card through the first interface; first disabling means for disabling the second interface when the first determination means determine that the non-contact card sends the response signal; second determination means for, when the first determination means determine that the non-contact card sends no response signal, determining after a driving signal is sent to the contact card through the second interface whether or not the contact card sends a response signal; and second disabling means for, when the second determination means determine that the contact card sends the response signal, disabling the first interface.

The above-mentioned object of the present invention are attained by a communication method of a card reader/writer, wherein data communication with one of non-contact card and contact card is performed by switching first means for performing data communication with the non-contact card through an antenna and second means for performing data communication with the contact card.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described below with reference to the drawings.

Figure 1:
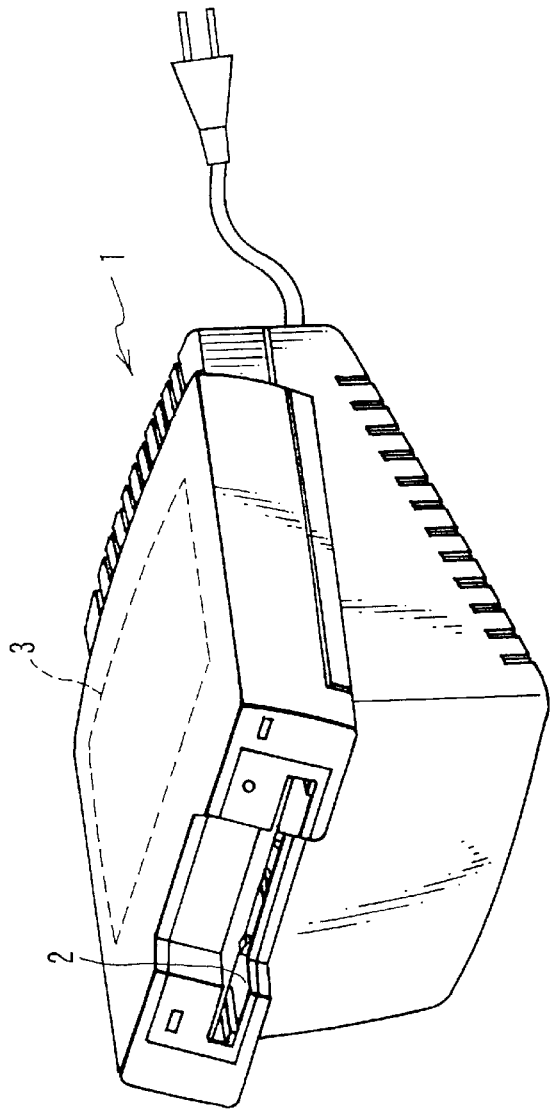
FIG. 1 is a perspective view of an IC card reader/writer according to the present invention.

FIG. 1 is a perspective view of an IC card reader/writer 1 according to the present invention. The IC card reader/writer 1 is provided therein with a contact card insertion 2 into which a contact card is inserted and a non-contact card antenna 3 for the communication with a non-contact card.

Figure 2:
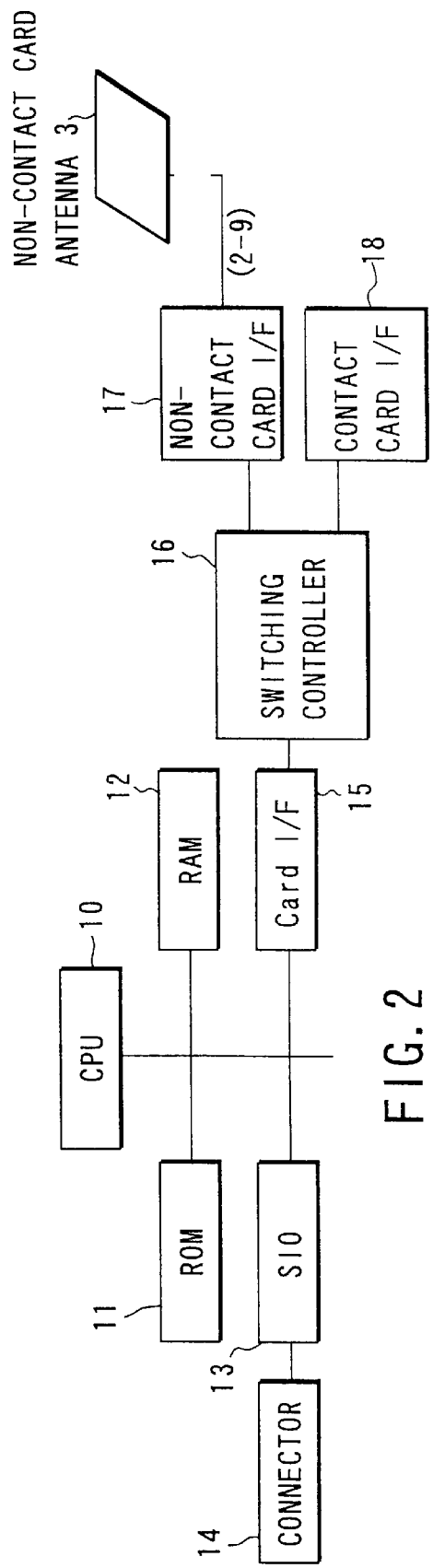
FIG. 2 is a block diagram showing the structure of a control system of the IC card reader/writer.

FIG. 2 is a block diagram showing the structure of a control system of the IC card reader/writer 1. The IC card reader/writer 1 has a CPU 10 for controlling the entire system of the IC card reader/writer 1, a ROM 11 for storing a control program, and a RAM 12 used for the controlling. The CPU 10 is connected to a communication controller (SIO) 13 for performing the communication with a superior apparatus (described later), and a card interface (Card I/F) 15 for performing data communication with an IC card (described later).

The communication controller 13 for performing the communication with the superior apparatus is connected to a connector 14 connectable to the superior apparatus. The card I/F 15 for performing the data communication with the IC card is connected to both the non-contact card antenna 3 which is connected to the non-contact card I/F 17 for performing the communication with the non-contact IC card through a switching controller 16, and a contact card I/F 18 having a mechanical connector for inserting the contact IC card therein.

Figure 3:
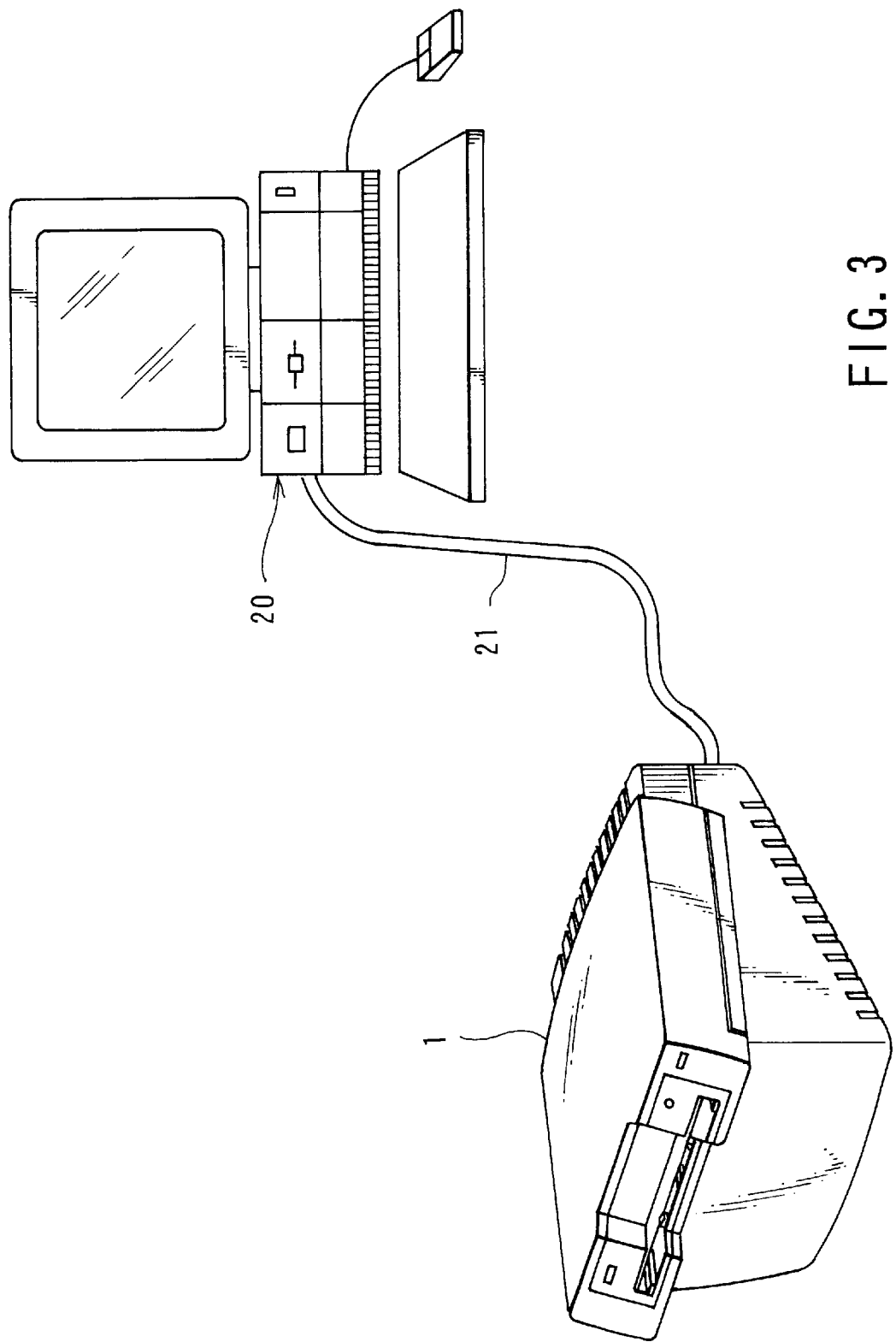
FIG. 3 shows an example of a connection of the IC card reader/writer with a superior apparatus.

FIG. 3 shows an example of a connection of the IC card reader/writer 1 to the superior apparatus. A personal computer 20 as the superior apparatus is connected to the connector 14 of the IC card reader/writer 1 via a cable 21 such as RS-232C.

Figure 4:
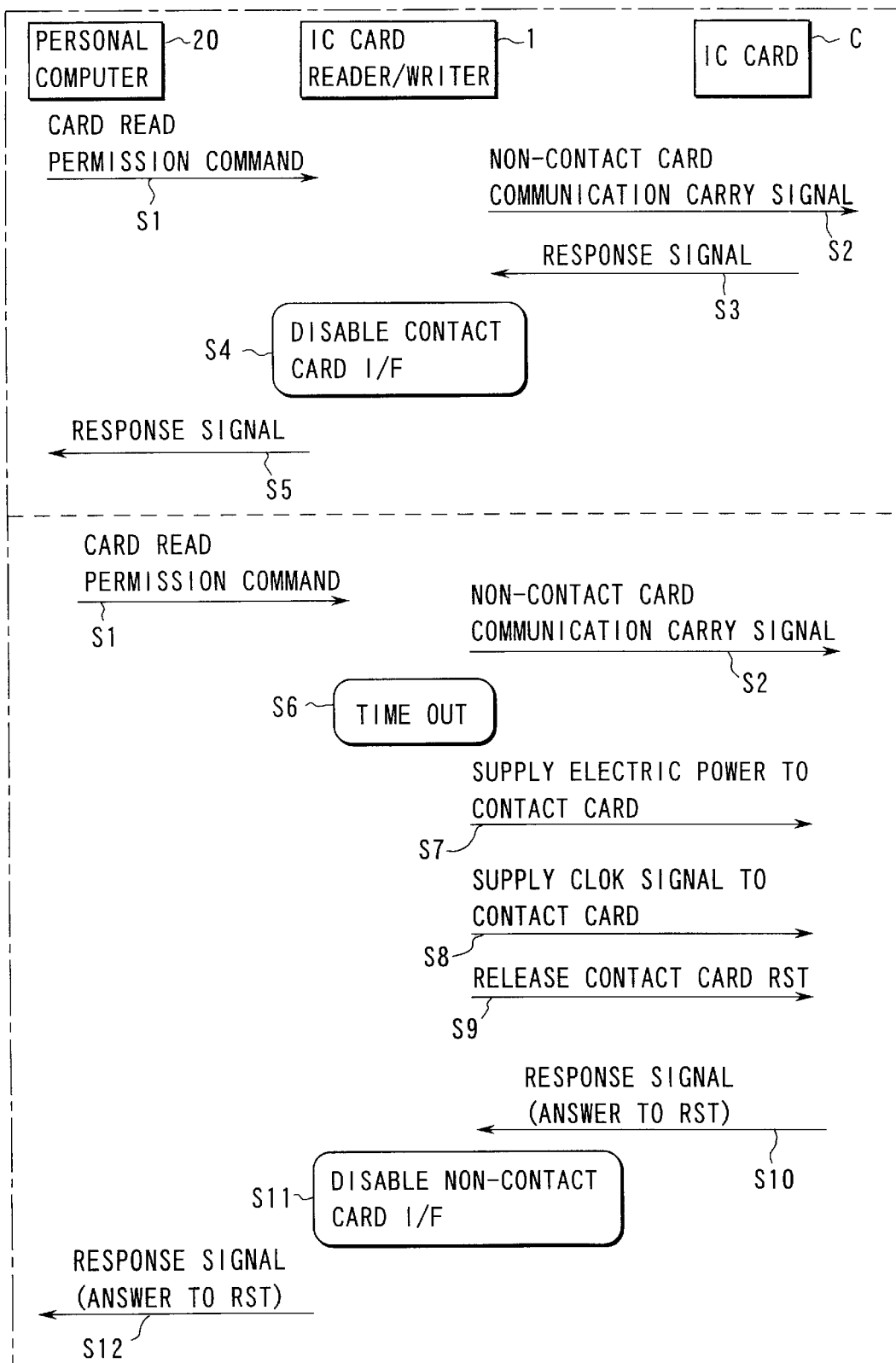
FIG. 4 is a transition diagram for explaining the command processing by the IC card reader/writer.

Next, the command processing by the IC card reader/writer 1 and the personal computer 20 as the superior apparatus having the above-mentioned constitution will be described below with reference to the transition diagram shown in FIG. 4.

The following description relates to the example wherein the communication with the contact card is performed after performing the communication with the non-contact card in accordance with a command issued by the personal computer 20.

In receiving a "card read permission" command from the personal computer 20 (S1), the IC card reader/writer 1 tries to perform the communication with the non-contact card, at first. In the communication process, the CPU 10 of the IC card reader/writer 1 controls the switching controller 16 via the card I/F 15 to switch the interface to the non-contact card I/F 17, and controls the non-contact card I/F 17 to send a carry signal used for the non-contact card communication through the antenna 3 to the non-contact IC card C (S2), then waits for a response signal therefrom.

When the response signal is sent from the non-contact IC card C through the antenna 3 (S3), the CPU 10 disables the contact card I/F 18 with use of the switching controller 16 (S4). The CPU 10 then sends the response signal sent from the IC card C to the personal computer 20 through the communication controller 13 (S5).

The CPU 10 determines that a time-out occurs when a response signal is not supplied from the non-contact IC card C after a predetermined period of time has passed after performing the steps S1 and S2 (S6). The CPU 10 then controls the switching controller 16 to switch the interface to the contact card I/F 18 through the card I/F 15, supplies electric power from the contact card I/F 18 to the contact card (S7); supplies a clock signal to the contact card (S8), and releases a reset releasing signal (RST) for releasing reset(S9). The contact card referred to in this description has a specification corresponding to that defined in ISO 7816.

When the CPU 10 receives the response signal (answer to RST) from an IC card C as a contact card (S10) after releasing RST, the CPU 10 determines that the communication with the contact card has been attained, and then controls the switching controller 16 through the card I/F 15 to switch the interfaces so as to disable the interface of the non-contact card (S11), and sends the response signal (answer to RST) to the personal computer 20 through the communication controller 13 (S12).

In this embodiment, the communication with the non-contact card is performed at first since the process of the communication with the non-contact card is easier to perform than that of the contact card. In order to perform the communication with the contact card, the contact card needs to be supplied with electric power. Therefore, some protection for detecting a power supply problem needs to be provided on the side of the IC card reader/writer 1. The processing of the communication with the contact card be complicated thereby.

Similarly, the communication with the contact card is not performed simultaneously with the communication with the non-contact card in this embodiment. In this embodiment, the interface of the non-contact card and the interface of the contact card are switched to each other in order to reduce the manufacturing cost, and thus the communication with the contact-card and that of the non-contact card cannot be attained in the same time. As described above, the switching controller 16 controls the switching of the interfaces in the present embodiment. When the communication with one of the contact card and the non-contact card is attained, the interface of another one of the contact card and the non-contact card is disabled. By disabling one of the interfaces in this manner, data can be supplied/received with reliability during the data communication between the superior apparatus and the IC card.

Figure 5:
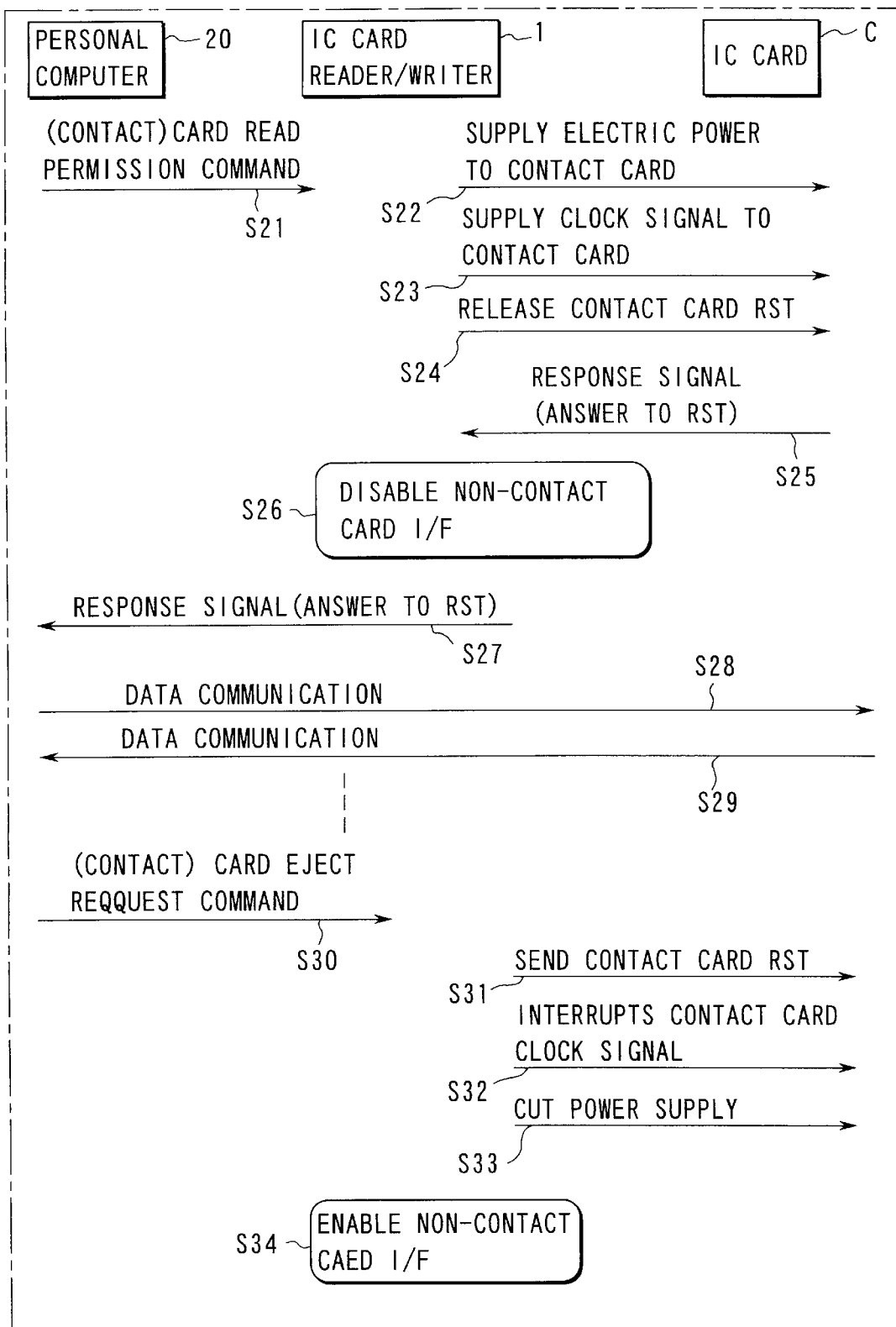
FIG. 5 is a transition diagram for explaining the command processing by the IC card reader/writer.

Next, the command processing between the IC card reader/writer 1 and the personal computer 20 will be described below with reference to the transition diagram shown in FIG. 5.

This description relates to the selection operation of selecting either the communication with the non-contact card or the communication with the contact card in accordance with the command issued by the personal computer 20.

When the CPU 10 of the IC card reader/writer 1 receives a "(contact) card read permission" command from the personal computer 20 (S21), the CPU 10 interprets the command, controls the switching controller 16 to switch the interface to the contact card I/F 18 through the card I/F 15, supplies electric power to the contact card from the contact card I/F 18 (S22), supplies a clock signal to the contact card (S23), and releases a reset releasing signal (RST)(S24). The contact card referred to in this description corresponds to the card defined in ISO 7816.

The CPU 10 determines that the communication with the contact card is attained when a response signal (answer to RST) is sent from the IC card C as a contact card after releasing the RST (S25), and controls the switching controller 16 through the card I/F 15 to disable the interface of the non-contact card (S26). The CPU 10 then sends the response signal (answer to RST) to the personal computer 20 through the communication controller 13 (S27).

The personal computer 20 then performs the data communication with the IC card C through the IC card reader/writer 1 (S28, S29).

When the CPU 10 of the IC card reader/writer 1 receives a "(contact) card ejection request" command from the personal computer 20 (S30), the CPU 10 interprets the command, sends a reset releasing signal to the IC card C as a contact card (S31), interrupts the clock signal (S32), and cuts the power supply (S33). The CPU 10 then ejects the IC card C from the contact card I/F 18, controls the switching controller 16 to switch the interface to the non-contact card I/F 17 through the card I/F 15 in order to enable the non-contact card I/F 17 (S34).

It goes without saying that, when the CPU 10 receives the "(non-contact) card read permission" command from the personal computer 20, the CPU 10 of the IC card reader/writer sends the "carry signal used for the non-contact card communication" to the IC card C as a non-contact card, and waits for the response signal from the IC card C as a non-contact card.

Figure 6:
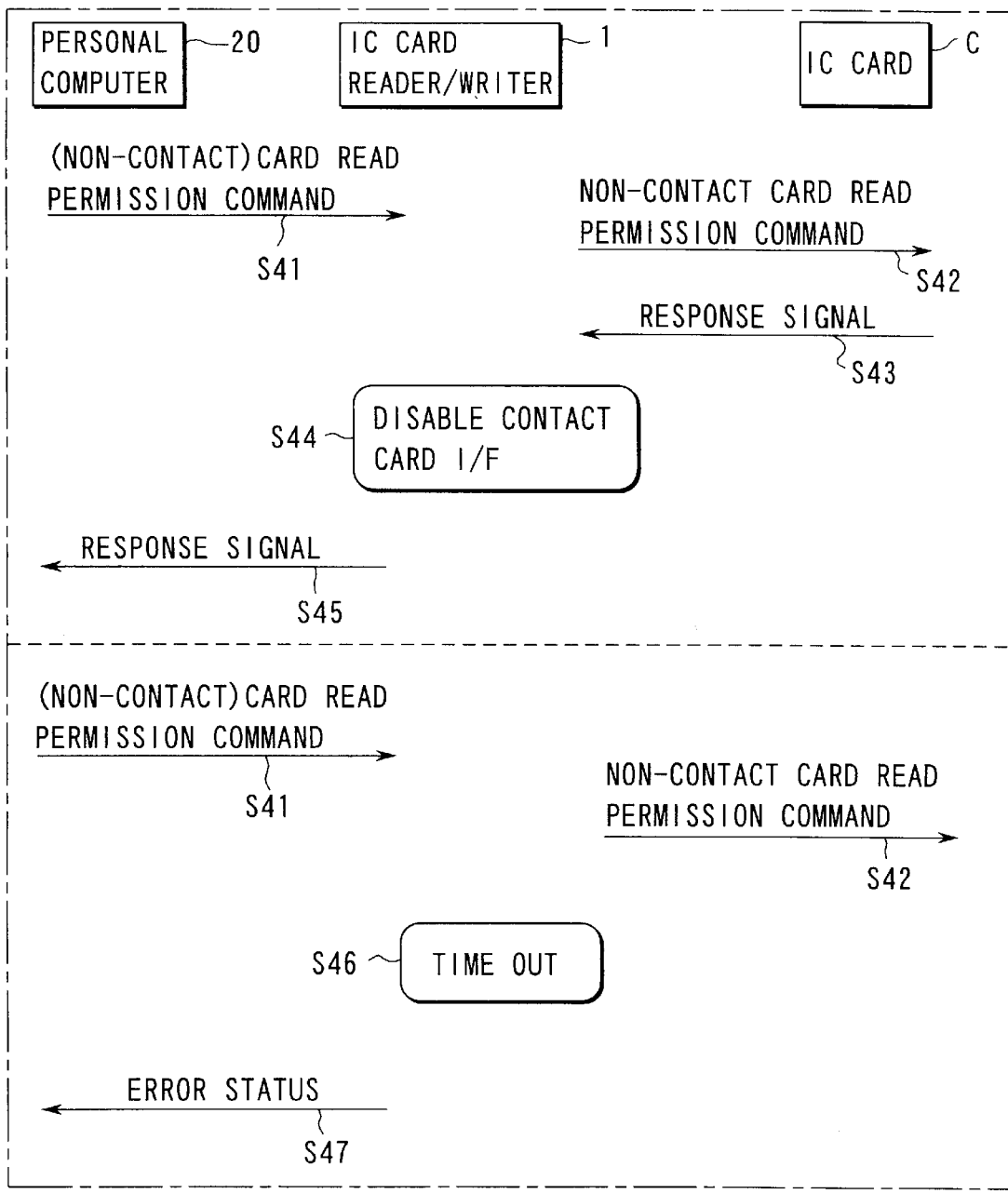
FIG. 6 is a transition diagram for explaining the command processing by the IC card reader/writer.

Next, the command processing between the IC card reader/writer 1 and the personal computer 20 will be described below with reference to the transition diagram of FIG. 6.

When the IC card reader/writer 1 receives the "(non-contact) card read permission" command from the personal computer 20 (S41), the CPU 10 controls the switching controller 16 through the card I/F 15 to switch the interface to the non-contact card I/F 17, controls the non-contact card I/F 17 to send the carry signal used for the communication with the non-contact card through the antenna 3 (S42), and waits for the response signal from IC card C as a non-contact card.

when the CPU 10 receives the response signal from the IC card C as a non-contact card (S43), the CPU 10 controls the switching controller 16 to switch the interface so as to disable the contact card I/F 18 (S44), and then sends the response signal sent from the IC card C as a non-contact card to the personal computer 20 through the communication controller 13 (S45).

When the CPU 10 receives no response signal from the IC card C as a non-contact card after a predetermined period of time has passed after performing the steps S41 and S42, the CPU 10 determines that a time-out occurs (S46), and sends an error status to the personal computer 20 (S47).

The transmission of the error status is performed also in the case where the interfaces of the contact card and the non-contact card are automatically switched in the IC card reader/writer 1.

As described above, according to the embodiment of the present invention, the circuit is formed so as to be used for both the communication with the contact card and the communication with the non-contact card, and the specifications of the non-contact card I/F and the contact card I/F are set equal. Thereby, the difference between the communication with the contact card and that of the non-contact card in the control CPU is eliminated. By virtue of this feature, the control of the communication is simplified, which enables the control of the communications with both the contact and non-contact cards.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A card reader/writer comprising:

first means for performing data communication with a non-contact card through an antenna;

second means for performing data communication with a contact card;

switching means for switching the second means and the first means; and control means for performing data communication with a card by using the switching means to switch one of the first means and the second means, wherein the control means perform data communication with the non-contact card at A first by using the first means when the control means receive a card read permission signal, and when the data communication with the non-contact card fails to be performed by using the first means, perform data communication with the contact card by using the second means.

2. A card reader/writer connected to a personal computer to perform data communication with a card comprising:

communication means for performing data communication with a non-contact card via an antenna;

processing means for performing data communication with a contact card;

switching means for switching the processing means and the communication means; and control means for, when an apparatus reader/writer receives a card read permission signal from the personal computer, controlling the switching means to switch the processing means and the communication means, and performing one of the data communication control of controlling data communication with the non-contact card by using the communication means and the data communication control of controlling data communication with the contact card by using the processing means, wherein the control means perform the data communication with the non-contact card at first by using the communication means when the control means receive a card read permission signal from the personal computer, and when the data communication with the non-contact card fails to be performed by using the communication means, perform the data communication with the contact card by using the processing means.

3. A communication method of a card reader/writer, wherein data communication with one of non-contact card and contact card is performed by switching first means for performing data communication with the non-contact card through an antenna and second means for performing data communication with the contact card, wherein data communication with the non-contact card is performed at first by using the first means when the card reader/writer receives a card permission signal, and when the data communication with the non-contact card fails to be performed by using the first means.

\* \* \* \* \*